United States Patent [19]
Weinert

[11] 3,873,199
[45] Mar. 25, 1975

[54] METHOD AND ARRANGEMENT FOR ADJUSTMENT OF PHOTOGRAPHIC COPYING APPARATUS

[75] Inventor: Volker Weinert, Munich, Germany

[73] Assignee: Agfa-Gevaert Aktiengesellshcaft, Leverkusen, Germany

[22] Filed: Sept. 20, 1973

[21] Appl. No.: 399,185

[30] Foreign Application Priority Data

Sept. 22, 1972 Germany............................ 2246744

[52] U.S. Cl....................... 355/38, 250/226, 355/77, 355/88, 356/179

[51] Int. Cl............................................ G03b 27/76

[58] Field of Search.................. 355/36, 38, 88, 77; 356/179; 250/226

[56] References Cited

UNITED STATES PATENTS

| | | | |
|---|---|---|---|
| 3,575,508 | 4/1971 | Fergg et al. | 355/38 X |
| 3,663,110 | 5/1972 | Rising | 355/38 X |
| 3,724,947 | 4/1973 | Paulus | 355/38 |

*Primary Examiner*—Richard A. Wintercorn
*Attorney, Agent, or Firm*—Michael S. Striker

[57] ABSTRACT

The adjustment of various correction values which must be stored in different storages in order to carry out a properly balanced color printing process are carried out in a predetermined order, each adjustment being made in one storage under particular operating conditions and then transferred to the appropriate storage by use of an auxiliary potentiometer and a null indicator.

14 Claims, 3 Drawing Figures

METHOD AND ARRANGEMENT FOR ADJUSTMENT OF PHOTOGRAPHIC COPYING APPARATUS

CROSS-REFERENCE TO RELATED APPLICATIONS

The present invention is related to my copending application, entitled "Photographic Copying Arrangement with Improved Color Compensation" filed simultaneously herewith.

BACKGROUND OF THE INVENTION

The present invention relates to a method and arrangement for adjusting color reproducing or copying apparatus (color printer) having three color channels, each of the channels determining the exposure time in a corresponding one of three primary colors. The first, second and third color channels have, respectively, a first, second and third photoreceiver which is exposed to the corresponding color and furnishes a corresponding color signal. Each of the color channels further has integrating circuit means for integrating the signal from the photoreceiver and furnishing a total color signal in correspondence thereto. The exposure is terminated in each channel when comparison of the integrator output signal (total color signal) to a reference signal indicates that the two are equal. The reference signal corresponds to the sum of correction signals stored in a number of storages. These correction signals correspond to the color sensitivity of the copying material, the color and density correction values required for a particular original to be reproduced, and the slope correction values required for the same original.

The initial adjustment for adjusting such color printers to furnish adequate copies of an original is quite difficult. It will be noted that various adjustments must be made which depend both on the printing paper (copying material) used and the original to be reproduced. For conventional copying equipment, both a considerable period of time must be spent for such adjustment and the operator must have a great deal of experience in the handling of such equipment. The adjustment is carried out on the basis of trial prints which are made with a predetermined value stored in the various storages. These storages are then adjusted to the proper values on the basis of these trial copies. Each time the storage values have been entered, the equipment must be tested to see whether the so-entered values yield satisfactory print of a calibrating original.

SUMMARY OF THE INVENTION

It is an object of the present invention to simplify the adjustment of the color printer. In particular it is an object of the present invention to allow entering of correction values which have been found adequate into the storages without any difficulty.

In accordance with the present invention, a photographic printer having a first, second and third color channel of the above-described type, and a plurality of storages, each of which must store a correction signal, adjusted for the original to be printed and the printing paper, during the exposure time. Each of the correction signals is stored in the storage, in accordance with the present invention, by furnishing an adjustment signal under predetermined operating conditions, comparing the adjustment signal to the signal stored in the storage, and adjusting the signal stored in the storage until it is equal to the adjustment signal. When all the signals in the storages have been so adjusted, the exposure can be carried out.

It is seen that the adjustment of the printer is considerably simplified by the method and arrangement of the present invention, since correction values which have been found to be optimum under specified operating conditions, that is, for example, with a calibrating original, can be entered into the storages by the above-mentioned comparison without any difficulties and then can remain unchanged in said storages until the exposure is carried out.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
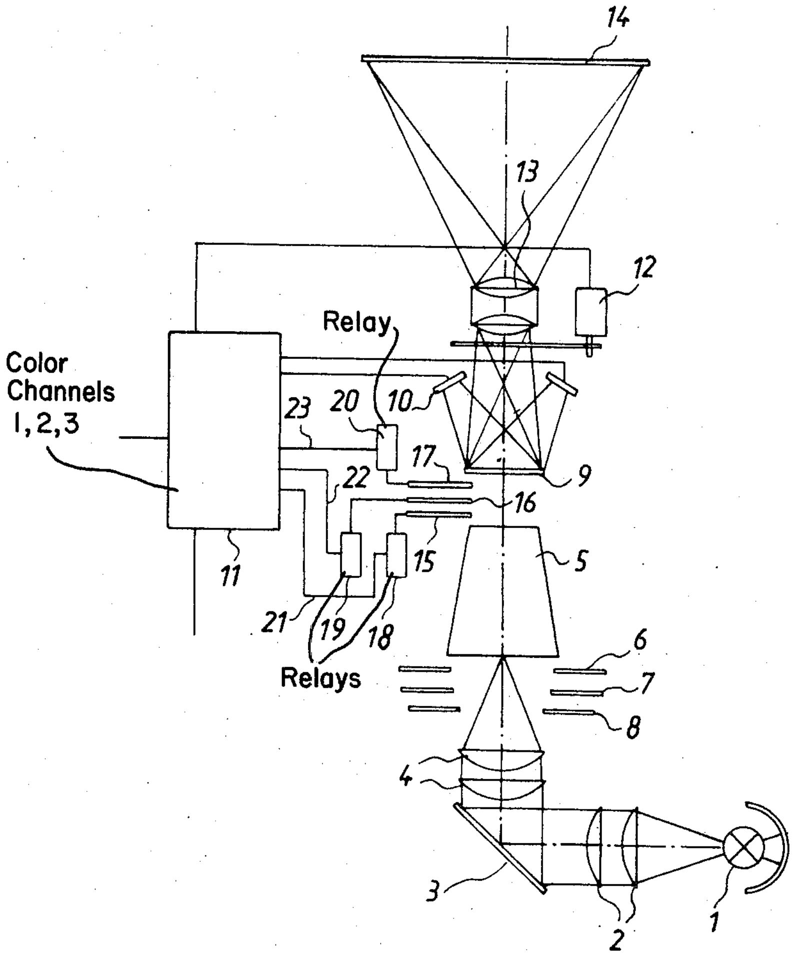
FIG. 1 shows a color printer to be adjusted in accordance with the present invention.

A preferred embodiment of the present invention will now be described with reference to the drawing.

FIG. 1 shows a light source 1 which furnishes light in all required wavelengths. This light is thrown via a double condenser 2 onto a mirror 3 where a further condenser lens 4 focuses the light onto a mixing shaft 5. Complementary color filters 6, 7 and 8 are arranged in front of the mixing shaft 5. These filters, as required, are inserted greater or smaller distances into the path of the light, thus coloring the light beam. The mixing shaft 5 causes the resulting light to be mixed homogeneously so that the light impinging upon the original 9 has an even brightness and color distribution. Following the original 9 in the direction of light propagation are a plurality of photoreceivers each of which is made sensitive selectively to the light of a particular color by the use of corresponding color filters. In a preferred embodiment of the present invention the photoreceivers are silicon photoelements 10. The silicon photoreceivers are placed outside of the path of the beam of light which is to effect the copying or print, but are arranged in the path of the stray light. Elements 10 are connected to a circuit 11 which will be described in more detail with reference to FIG. 2. Behind elements 10 in the direction of light propagation is situated an electromagnetically operated shutter 12. Situated behind shutter 12 is an objective 13 which forms a sharp image of the original 9 on the light sensitive layer of a carrier 14. The carrier 14 may for example be a roll of printing paper which is automatically advanced after each exposure time. The properties of the printing material, namely the above-mentioned photosensitive layer, are very important in the adjustment of the circuitry in stage 11.

Situated between the mixing shaft 5 and the original 9 are guides for color filters 15, 16 and 17 which are filters in the complementary colors. These may be introduced into the path of the beam by means of relays 18, 19 and 20. Relays, 18, 19 and 20 are connected via lines 21, 22 and 23 to stage 11. Output signals of stage 11, namely terminating signals, are applied to each of lines 21, 22 and 23 when the introduction of the corresponding complementary filter into the path of the light is desired in order to terminate the illumination in a particular color.

Figure 2:
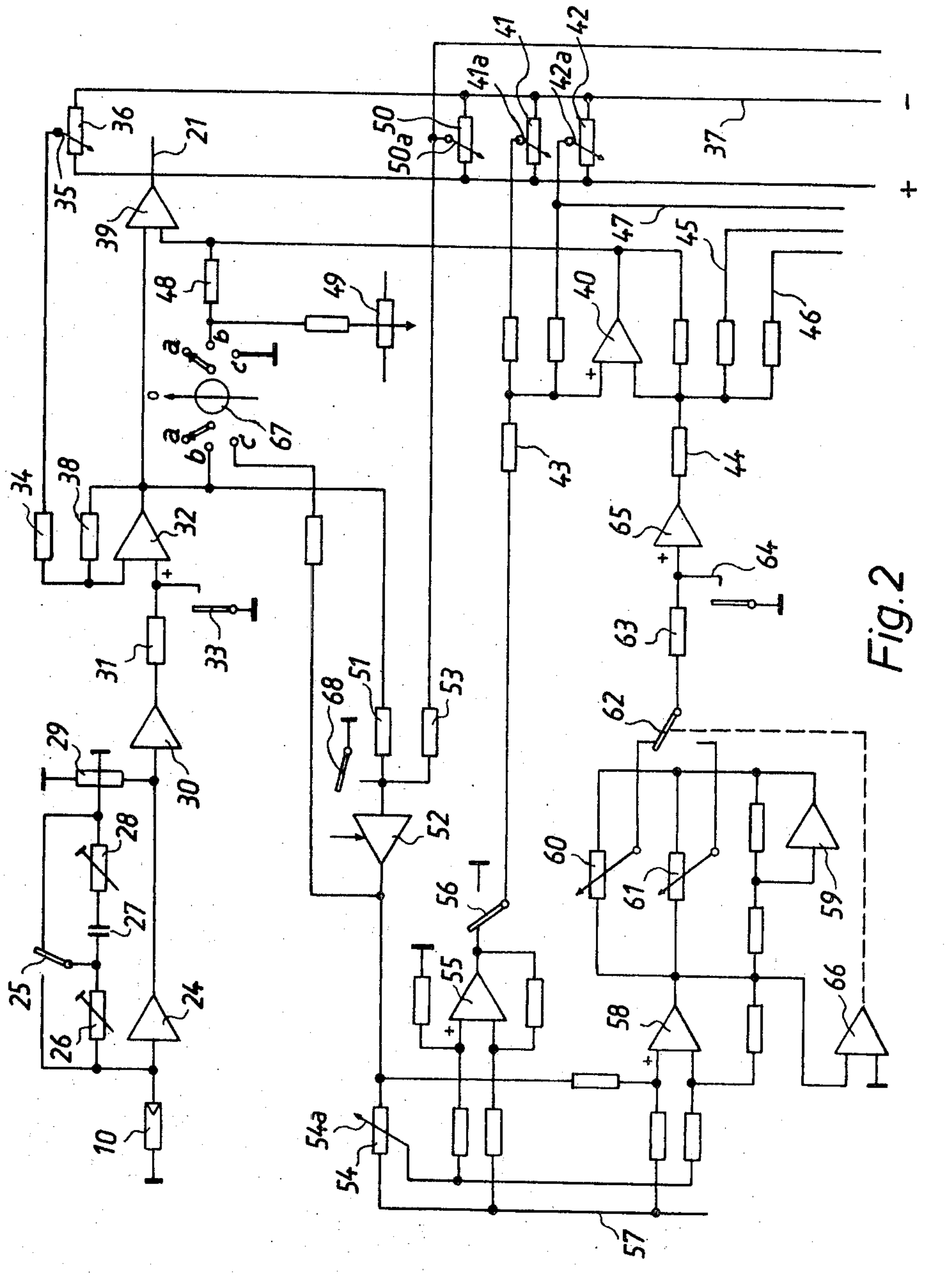
FIG. 2 shows one color channel of the printer of FIG. 1.

FIG. 2 shows one channel of the three color channels indicated schematically by block 11 in FIG. 1. Block 11 comprises three identical color channels, herein referred to as the first, second and third color channels. At the input of each of these color channels is a photoreceiver 10 or a group of such photoreceivers. As will be discussed in more detail below, the three individual color channels are connected by a number of lines which carry signals which are to be entered into all of the color channels. To return to FIG. 2, the photoelement 10 has one terminal connected to integrator circuit means shown as an operational amplifier 24 having a selector switch 25 connected in the feedback circuit. In the position of switch 25 shown in FIG. 2, variable resistance means, namely variable resistor 26, are connected in the feedback circuit, while an RC circuit comprising a capacitor 27 connected in series with a variable resistor 28 are short-circuited by selector switch 25. In the other position of selector switch 25, the variable resistance means are short-circuited, while the RC circuit is connected into the feedback circuit of operational amplifier 24. Connected to one terminal of resistor 28 is the wiper arm of a potentiometer 29 one of whose end terminals is connected to the output of operational amplifier 24, while the other end terminal is connected to ground potential. Adjustment of potentiometer 29 allows the printer to be adjusted for different formats of the original. This may be done by mechanical means such as marks in the negative mask. Operational amplifier 24 thus serves as a proportional amplifier when switch 25 is in the position shown, or as integrator circuit means when switch 25 is in its other position. The output of operational amplifier 24 is connected to the input of a logarithmic amplifier 30 whose output is connected through a resistor 31 to the input of a summing amplifier 32. Summing amplifier 32 is herein referred to as first summing amplifier means. First switch means, here a switch 33, are provided to short circuit the above-mentioned input of summing amplifier 32 to ground potential under circumstances that will be discussed below.

The other input of summing amplifier 32 is connected through a resistor 34 to the wiper arm of a potentiometer 35. Potentiometer 35 is herein referred to as first storage means. One end terminal of potentiometer 35 is connected to negative potential, while the other end terminal is connected to the positive side of a constant voltage source, namely a battery, which also serves as the voltage source for further potentiometers as will be discussed below. A resistor 38 serves as a feedback resistor for summing amplifier 32. The output of summing amplifier 32 is connected to one input of a comparator 39, whose output is connected to a line 21. A signal on line 21 terminates the illumination in the color channel. Specifically, the complementary color filter is introduced into the path of the light by a magnet activated by the signal on line 21. The other input of comparator 39 receives the reference signal. The reference signal is furnished at the output of a second summing amplifier, namely a summing amplifier 40. The inputs of summing amplifier 40 are derived from third and second storage means, namely a potentiometer 41 having a wiper arm 41*a* which serves to store the required density correction signal and a potentiometer 42 having a wiper arm 42*a* furnishing the required color correction signal. Further, through a resistor 43, the positive input of summing amplifier 40 receives a color undercorrection signal, while the other input of summing amplifier 40 receives, through a resistor 44, the required slope correction signal. Finally, lines 45 and 46, also connected to the other input of summing amplifier 40 furnish color correction signals from the second and third color channels, that is the color channels not shown in FIG. 2, while a line 47 furnishes the color-correction signal from the first color channel to the second and third color channels. These interconnecting lines are required so that the different color-correction signals can be combined in such a manner that the total density of the copy remains constant.

The output of summing amplifier 40 is connected through a resistor 48 to the wiper arm of an auxiliary potentiometer 49 whose function will be described below. Further connected across the battery which serves as the voltage source for the above-mentioned potentiometers 36, 41 and 42 is a potentiometer 50 having a wiper arm 50*a*. This potentiometer serves to set the slope-center point. The signal at wiper arm 50*a* is also effective in all three channels. It is connected to one input of a sample and hold circuit 52 which will be described further below, through a resistor 53 and is connected to similar sample and hold circuits in the other channels through a line 50*b*.

The input of the above-mentioned sample and hold circuit 52 is also connected through a resistor 51 to the output of summing amplifier 32. Sample and hold circuit 52 functions to store a signal furnished during a first time period for use during a second time period. Thus a signal applied to sample and hold circuit 52 prior to the illumination time will be retained at the output of sample and hold circuit 52 throughout the illumination or exposure time. During the exposure time, the signal at the output of sample and hold circuit 52 corresponds to the difference between the density of the original being illuminated in the particular color associated with the particular color channel and the density of a calibrating original in that color. The signal at the output of sample and hold circuit 52 is applied to a potentiometer 54 having a wiper arm 54*a* which furnishes a signal to the positive input of a summing amplifier 55. The signal at the output of summing amplifier 55 is the color undercorrection signal which, as previously mentioned is applied to one input of summing amplifier 40 through a resistor 43. A switch 56 serves to disconnect the output signal of amplifier 55 from resistor 43. The switch is activated during initial adjustment of the equipment.

The terminal of potentiometer 54 which is not connected to the output of sample and hold circuit 52 is connected to a line 57. Line 57 is connected to the corresponding terminal of corresponding potentiometers in the remaining color channels. The signal on line 57 thus is:

$$U=\frac{1}{3}\Sigma(Di-DiE)$$

where $Di$ is, in every case, the density of the original to be reproduced in the particular color associated with the particular color channel, while $DiE$ is the corresponding density of the calibrating negative. The signal on line 57 is directly applied to one input of a summing amplifier 58 at whose other input is connected the wiper arm 54*a* of potentiometer 54, herein referred to as the undercorrection potentiometer. The output signal of amplifier 58 is inverted by an inverter 59. Connected with the output of the amplifiers 58 and 59 are two potentiometers 60, 61 in parallel as voltage dividers and the operation of a switch 62 causes the wiper arm of either potentiometer 60 or potentiometer 61 to be applied to one terminal of a resistor 63 whose other terminal is connected to the input of an impedance changing stage, which, in a preferred embodiment of the present invention may be an emitter-follower stage, numbered 65. The position of the above-mentioned switch 62 is determined by the output of a comparator 66 which compares the output of amplifier 58 to predetermined reference signals and switches switch 62 accordingly. These reference signals are so set that the position of switch 62 connects potentiometer 60 into the circuit for overexposed negatives and potentiometer 61 for underexposed negatives. Potentiometers 60 and 61 together constitute the fourth storage means wherein the slope corrections values are stored. The potentiometers are set so that the amplitude of voltage for slope correction is the same, only the sign of the voltages supplied by the two potentiometers is different.

The above-described arrangement operates as follows during a printing cycle.

Originally, switch 25 is in the position shown in the FIGURE, in which capacitor 27 and resistor 28 are shorted out. A signal corresponding to the transmissivity of the original in the corresponding color is generated by photoelement 10 and subjected to proportional amplification by amplifier 24. A corresponding logarithmic signal appears at the output of amplifier 30. This signal is stored as a deviation from the slope center value in sample and hold circuits 52. At the start of the illumination, switch 25 is put into the position not shown in the FIGURE. Amplifier 24 now serves as an integrator and integrates the current delivered by photoelement 10. Thus, the input to comparator 39 from summing amplifier 32 is a steadily increasing input corresponding to the total illumination that the negative has undergone in the particular color. When a predetermined relationship exists between the output signal of amplifier 32, as applied to the input of amplifier 39, and the reference signal which is applied to the second input of amplifier 39, a signal is generated on line 21 which causes the illumination in the particular color to be terminated.

However, before the illumination can be carried out, the system must first be adjusted. For adjusting potentiometers 36, 50 and 61, a null indicator instrument 67 is used. This null indicator instrument has a first and second contact which are movable jointly between a first, second and third position. In position *a* both contacts are deactivated. This position is occupied by the null indicator during the printing process. In position *b*, the right contact of the instrument is connected through a resistor to the wiper contact of auxiliary potentiometer 49, while the left contact is connected to the output of summing amplifier 32. In the last position, position *c*, the right contact is connected to ground potential, while the left contact is connected to the output of sample and hold circuit 52.

The first step in the adjustment of the equipment is to adjust potentiometer 36 to correspond to the sensitivity of the copying material (printing paper) in all three color channels. In a preferred embodiment of the present invention, the values stored in the various storages are zero when the characteristic for which the equipment is to be adjusted has an average value. Adjustment is then made about this average value.

First, by empirical testing, or by specification of the sensitivity of the printing paper, the density correction and color-correction values which must be set at potentiometers 41 and 42 for all three color channels are set which yield an optimum copy of a calibrating original. Once these correction values have been set, the contacts of null indicator 67 are brought into position *b*. Further, switches 33 and a switch 68 in front of the "sample and hold" amplifier 52 are switched to the closed position so that the circuit for the color undercorrection and the slope correction are both switched to a zero potential and thereby rendered inactive. Null indicator 67 now has the second contact connected to the output of amplifier 32 whose signal is a function only of the position of potentiometer 36, while the other contact of null instrument 67 is connected to the difference between the output voltage of amplifier 40 and the voltage at the wiper arm of the auxiliary potentiometer 49. If no correction values are present at potentiometers 41, 42 then the output voltage of amplifier 40 is zero volts. However, if values have been entered on potentiometers 41 and 42 and potentiometer 49 is now adjusted until instrument 67 indicates a null value, then, for potentiometer 36 at zero volts, the auxiliary potentiometer 49 is then set to the value equal to the values set into potentiometers 41 and 42. Potentiometers 41 and 42 are then reset to the zero position and potentiometer 36 is adjusted until a null is again indicated on instrument 67. At this point the setting of potentiometer 36 corresponds to that of the auxiliary potentiometer. Because of the double comparison the sign of the voltage set in potentiometer 36 is also correct. This type of transfer of stored values may be used even if, for example, the signal stored in storage 36 also enters into the signal applied to summing amplifier 40 since the double comparison will always result in the correct sign.

Figure 3:
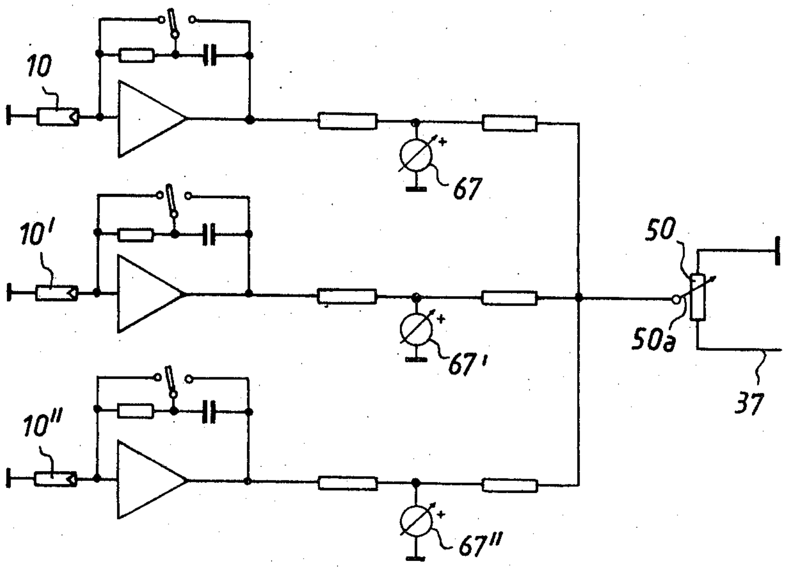
FIG. 3 is a simplified overall circuit diagram showing only the portion required for the slope-center adjustment.

After the setting of potentiometer 36 has been achieved, the slope-center point is to be set into potentiometer 50. The contacts on instrument 67 are moved into position *c*. The filters shown in FIG. 1, namely color filters 6, 7 and 8 are fully opened. A calibrating negative 9 is introduced into the printer to serve as a negative. The calibrating original has a color balance such that good copies are derived for average illumination in all three colors. Resistance 26 which determines the amplification factor of amplifier 24 is so set that the product RxC of resistor 26 and capacitor 27 in all three channels is the same. Under these conditions, the output signal of amplifier 24 as proportional amplifier is just equal to the signal furnished by the amplifier when it acts as an integrator at the time at which the illumination in the particular color is to be terminated. Thus the signal at the leftmost contact of null instrument 67 is a signal signifying the difference between the color density value for the original as furnished at the output of amplifier 32 and the comparison values set into potentiometer 50, that is the value at the potentiometer arm 50*a*. Referring now to FIG. 3, null indicators 67, 67' and 67'' in all three color channels are watched, while potentiometer arm 50*a* is adjusted until one of instruments 67 indicates a null value. This point is used as the setting for potentiometer 50*a*. Next, the complementary color filter of the second channel is inserted into the path of the light until the null instrument in the corresponding channel also indicates zero. The third color filter is then also so inserted into the path of the light until the third null instrument indicates a null. The printing apparatus then is adjusted in such a manner that the calibrating original will cause the illumination time in all three color channels to be the same.

It remains to enter the correct values into the slope correction potentiometers 60 and 61. For this purpose, switch 33 must be open and so must switch 68. An original to be printed is now inserted into the path of the light. For this original, it is probable that the color balance is not such that equal illumination times will be required. Again, empirically optimum values of the setting for potentiometer 42 must be found. During this time the color undercorrection signal is to be deactivated by activation of switch 56.

Instrument 67 is switched to position *b*. The signal at the output of amplifier 32, that is the signal applied to the leftmost contact of instrument 67 is, under these conditions, a signal indicative of the density of the original in the particular color, as modified by the correct setting of potentiometer 36. The signals at the other input are the correction values which are then taken over into auxiliary potentiometer 49 as described above. After the null position has been achieved, the color correction values 42 are reset to zero and potentiometers 60 or 61 adjusted to take over the value set in auxiliary potentiometer 49. For under and overexposed originals, the above adjustment must of course be carried out separately.

The above-described arrangements of course can operate in exactly the same fashion if instead of potentiometers banks of fixed resistors are used with associated switching contacts. Further, of course lamp 1 which furnishes light in the three different colors can be replaced by individual lamps each furnishing the light in one color and which may be individually turned off.

While the invention has been illustrated and described as embodied in a specific printer using potentiometers as storage means, it is not intended to be limited the the details shown, since various structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Arrangement for adjusting photographic copying apparatus having a first, second and third color channel for controlling, respectively, the illumination time in a first, second and third primary color, said first, second and third color channel having, respectively, a first, second and third photoreceiver, first, second and third integrator means, each connected to the output of a corresponding one of said photoreceivers, for furnishing, respectively, a first, second and third total color signal corresponding to the total quantity of illumination having impinged upon the corresponding one of said photoreceivers during said illumination time, and first, second and third terminating means for terminating the exposure in said first, second and third color channel, respectively, when the corresponding one of said total color signals is equal to a corresponding one of a first, second and third reference signal, in combination, first, second and third and fourth storage means in each of said color channels, for storing, respectively, first, second and third and fourth signals corresponding respectively to the sensitivity to the corresponding color of the copying material, the required color correction value in the corresponding color, the required density correction value, and the slope correction value, said fourth signal constituting, at least in part, a reference signal, at least one of said storage means being adjustable under predetermined operating conditions to a calibrating signal corresponding to the signal to be stored in another of said storage means during the exposure time; and null indicator means for comparing said calibrating signal to said signal in said other of said storage means and for indicating equality when the signal in said other storage means has been adjusted to equal said calibrating signal.

2. An arrangement as set forth in claim 1, wherein said first, second, third and fourth storage means comprise, respectively, a first, second, third and fourth potentiometer, the signals at the wiper arms of said first, second, third and fourth potentiometers constituting, respectively, said first, second, third and fourth signals.

3. An arrangement as set forth in claim 1, further comprising auxiliary storage means connected to said at least one storage means and said null indicator means.

4. An arrangement as set forth in claim 3, wherein said auxiliary storage means comprise an auxiliary potentiometer, the signal at the wiper arm of said auxiliary potentiometer constituting an auxiliary signal.

5. An arrangement as set forth in claim 3, wherein each of said color channels further comprises a logarithmic amplifier connected to the output of said integrator circuit means; a first summing amplifier having a first input connected to the output of said logarithmic amplifier and a second input connected to the output of said storage means; a second summing amplifier for furnishing said reference signal; slope center storage means for storing a slope center signal corresponding to the desired slope center; sample and hold storage means having an input connected to the output of said slope center storage means and to the output of said first summing amplifier; wherein said null indicator means has a first and second contact movable simultaneously to a first and second operating position; wherein, in said first operating position, said first contact is connected to the output of said second summing amplifier means and the output of said auxiliary storage means, and in the second operating position said first contact is connected to ground potential; and wherein said second contact is connected to the output of said first summing amplifier means when in said first operating position, and to the output of said sample and hold circuit means when in said second operating position.

6. An arrangement as set forth in claim 5, further comprising first, second and third switch means for respectively connecting said first input of said first summing amplifier means, said input of said sample and hold circuit means, and the output of said fourth storage means to ground potential when closed.

7. An arrangement as set forth in claim 1, wherein said integrator circuit means each comprise an operational amplifier having an RC feedback circuit; further comprising adjustable resistance means connected in series with each of said RC circuits; and selector switch means connected in said feedback circuit of each of said operational amplifiers, for selectively short-circuiting said RC circuit or said adjustable resistance means, whereby each of said operational amplifiers serves, selectively, as integrator means or as a proportional amplifier.

8. In photographic apparatus for making color copies of originals on copying material, said copying apparatus having a first, second and third color channel for controlling, respectively, the illumination time in a corresponding one of a first, second and third primary color, said first, second and third channels having, respectively, first, second and third photoreceiver means for furnishing, respectively, a first, second and third color signal corresponding to light falling upon the photoreceiver means in the corresponding one of said colors, first, second and third integrator circuit means each connected to the output of a corresponding one of said photoreceiver means for furnishing, respectively, a first, second and third total color signal corresponding to the total quantity of illumination having fallen upon a corresponding one of said photoreceiver means during said illumination time, a plurality of correction signal storage means in each of said channels for furnishing correction signals each compensating for a determined characteristic of said originals or said copying material and applying selected ones of said correction signals to said total color signals during said illumination time, means for furnishing a first, second and third reference signal each corresponding at least in part to a selected one of said correction signals in the corresponding channel, first, second and third comparing means for comparing, respectively, said first, second and third total color signals as modified by said correction signals to said first, second and third reference signals and furnishing a first, second and third terminating signal for terminating the exposure in the corresponding one of said color channels when a predetermined relationship exists between the so-compared signals, a method for adjusting said apparatus, comprising, in combination, the steps of applying a variable calibrating signal to said apparatus under predetermined operating conditions of said apparatus; varying said variable calibrating signal until said apparatus furnishes optimum copies of a selected original, the variable calibrating signal required for said optimum copies constituting the desired calibrating signal; comparing said desired calibrating signal to a corresponding one of said correction signals stored in said storage means, and adjusting said correction signals stored in said storage means until the so-adjusted correction signal is equal to said desired calibrating signal.

9. A method as set forth in claim 8, wherein said step of comparing said desired calibrating signal to the corresponding one of said correction signals comprises comparing said desired calibrating signal to an auxiliary signal stored in an auxiliary storage and adjusting said auxiliary signal until said auxiliary signal is equal to said desired calibrating signal; switching off said desired calibrating signal; comparing said auxiliary signal to said correction signal stored in said storage means and adjusting said correction signal in said storage means until said correction signal is equal to said auxiliary signal.

10. A method as set forth in claim 9, wherein said storage means further comprise a single slope center storage for furnishing a slope center signal to said first, second and third color channels; wherein said step of applying said variable calibrating signal comprises furnishing said first, second and third color signals for a calibrating original; wherein said step of varying said variable calibrating signal comprises amplifying said first, second and third so-furnished color signals by an amplification factor adjusted in such a manner that a corresponding amplified color signal equal to the corresponding one of said total color signals at the termination of the exposure of the corresponding color is created; wherein said step of comparing comprises comparing said slope center signal simultaneously to said amplified color signals; and wherein said step of adjusting said correction signal comprises adjusting said slope center signal until said slope center signal is equal to one of said amplified color signals.

11. A method as set forth in claim 10, further comprising the step of decreasing the light impinging upon said photoreceivers in the other two of said color channels until each of said amplified color signals is equal to the so-adjusted slope center signal.

12. A method as set forth in claim 11, wherein said step of decreasing said light falling on said photoreceivers in the other two of said color channels comprises inserting complementary color filters partially into the paths of said lights.

13. A method as set forth in claim 10, wherein said correction signals comprise first correction signals corresponding to the sensitivity to the corresponding color of the copying material and second correction signals corresponding to the required slope correction value; and wherein said method of adjusting said apparatus comprises adjusting said first correction signals, said slope center signals and said slope correction signals in that order.

14. A method as set forth in claim 13, wherein said predetermined operating conditions comprise a corrected first correction signal, a corrected slope center signal, and an original selected from the originals to be reproduced; further comprising the step of furnishing a comparison signal corresponding to the brightness of said original in a selected one of said colors, as modified by said adjusted first correction signal; wherein the step of comparing comprises comparing the difference between said desired calibrating signal and said auxiliary signal to said comparison signal and adjusting the auxiliary signal until said difference is equal to said comparison signal, comparing the so-adjusted auxiliary signal to said slope correction signal, and adjusting said slope correction signal until said slope correction signal is equal to the so-adjusted auxiliary signal.

* * * * *